United States Patent [19]

Minami

[11] 4,130,348
[45] Dec. 19, 1978

[54] OPTICAL SYSTEM FOR A COHERENT LIGHT ILLUMINATING SOURCE

[75] Inventor: Masana Minami, Kawasaki, Japan

[73] Assignee: Tokyo Shibaura Electric Co., Ltd., Kawasaki, Japan

[21] Appl. No.: 821,192

[22] Filed: Aug. 2, 1977

Related U.S. Application Data

[63] Continuation of Ser. No. 630,497, Nov. 10, 1975, abandoned, which is a continuation of Ser. No. 506,853, Sep. 17, 1974, abandoned.

[30] Foreign Application Priority Data

Sep. 18, 1973 [JP] Japan .................................. 48-104559

[51] Int. Cl.² ............................................. G02B 27/28
[52] U.S. Cl. ............................... 350/162 SF; 350/3.81
[58] Field of Search ................. 350/3.5, 162 SF, 3.81, 350/3.82

[56] References Cited

U.S. PATENT DOCUMENTS

| 3,782,804 | 1/1974  | Kanazawa et al. | 350/3.5     |
|-----------|---------|-----------------|-------------|
| 3,838,904 | 10/1974 | Takeda et al.   | 350/162 SF  |
| 3,862,357 | 1/1975  | Kanazawa et al. | 350/162 SF  |

OTHER PUBLICATIONS

Tsunoda et al., *Applied Optics*, vol. 13, No. 9, Sep. '74, pp. 2046–2051.

*Primary Examiner*—Ronald J. Stern
*Attorney, Agent, or Firm*—Cushman, Darby & Cushman

[57] ABSTRACT

An optical system for a object illuminating light source includes a phase plate for giving "0"-relative phases or "$\pi$"-relative phases to the incident light fluxes to cancel with respect to one another all the interference fringes except for those two light fluxes incident to define a maximum angle.

6 Claims, 19 Drawing Figures

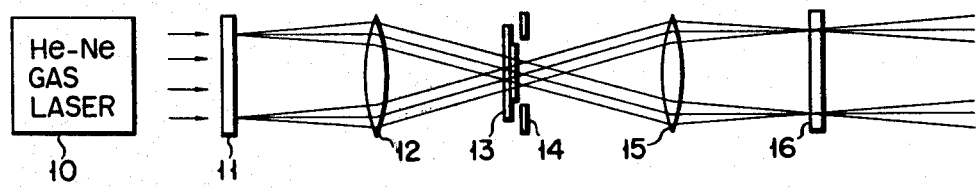

FIG. 4A

| 0 | π | 0 | 0 | 0 |
|---|---|---|---|---|

FIG. 4B

| 0 | π | 0 | 0 | 0 |
|---|---|---|---|---|
| π | 0 | π | π | π |
| 0 | π | 0 | 0 | 0 |
| 0 | π | 0 | 0 | 0 |
| 0 | π | 0 | 0 | 0 |

FIG. 5A

| π | π | π | 0 | π |
|---|---|---|---|---|

FIG. 5B

| π | π | π | 0 | π |
|---|---|---|---|---|
| π | π | π | 0 | π |
| π | π | π | 0 | π |
| 0 | 0 | 0 | π | 0 |
| π | π | π | 0 | π |

FIG. 6A

| π | 0 | π | π | π |
|---|---|---|---|---|

FIG. 6B

| π | 0 | π | π | π |
|---|---|---|---|---|
| 0 | π | 0 | 0 | 0 |
| π | 0 | π | π | π |
| π | 0 | π | π | π |
| π | 0 | π | π | π |

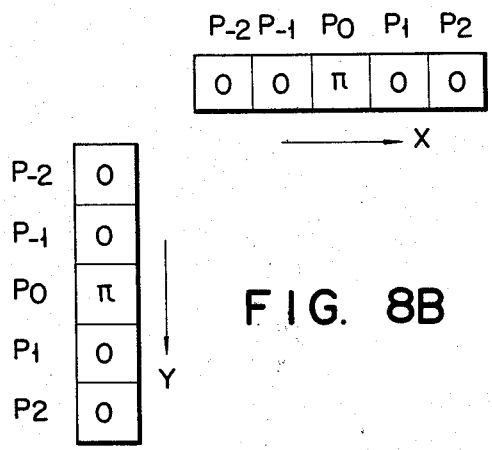
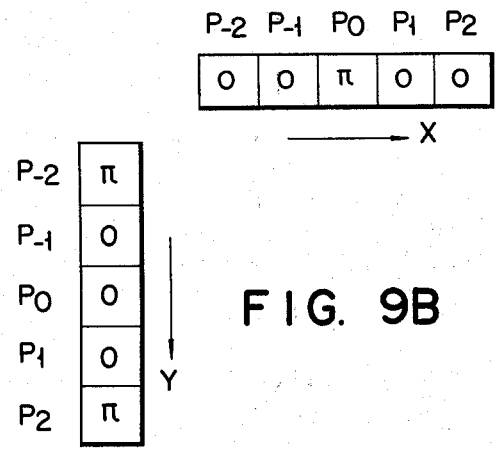
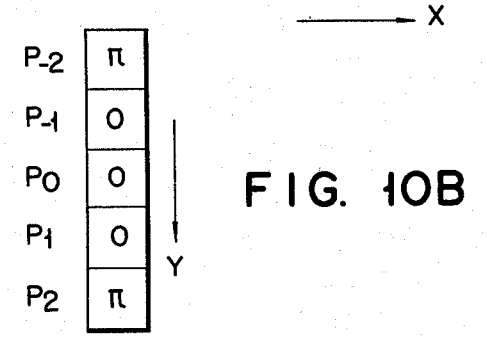

OPTICAL SYSTEM FOR A COHERENT LIGHT ILLUMINATING SOURCE

This is a continuation, of application Ser. No. 630,497 filed Nov. 10, 1975 (now abandoned) which is a continuation of Ser. No. 506,853, filed Sept. 17, 1974 (now abandoned).

BACKGROUND OF THE INVENTION

This invention relates to an optical system for a coherent light illuminating source which is used for effecting an optical recording such as a hologram.

Where a hologram is recorded, it is known to cause parallel light rays from a coherent light source to be passed through a diffusion plate so as to illuminate a subject. In this method, a bad influence due to mars and dirt and dust is restricted and the concentration of a light on a low frequency component can be avoided in a Fourier transform holography. As a result, a better recording can be performed. If, however, it is necessary to reduce the F-value of an optical system, speckle noises due to a diffusion illumination are superposed on a reproduced image with the consequent low resolution.

SUMMARY OF THE INVENTION

It is accordingly the object of this invention to provide an optical system for a coherent light illuminating source which is substantially free from any bad effects due to mars and dirt and dust, capable of restricting the concentration of a light on a low frequency component in a case of a Fourier transform holography and capable of preventing occurrence of speckle noises so that a reconstruction can be effected with redundancy and high resolution.

BRIEF DESCRIPTION OF THE DRAWING

FIGS. 1A and 1B show a phase plate on which a phase plate of an optical system according to this invention is based;

FIG. 2 shows schematically an optical system according to one embodiment of this invention;

FIGS. 3A and 3B show the phase plate used in the optical system of FIG. 2;

FIGS. 4A, 4B to 6A, 6B show modifications, respectively, of the phase plate used in the optical system of FIG. 2;

FIGS. 8A, 8B to 10A, 10B show modifications, respectively, of the phase plate used in the optical system of FIG. 2.

DETAILED DESCRIPTION OF THE INVENTION

Figure 7A:
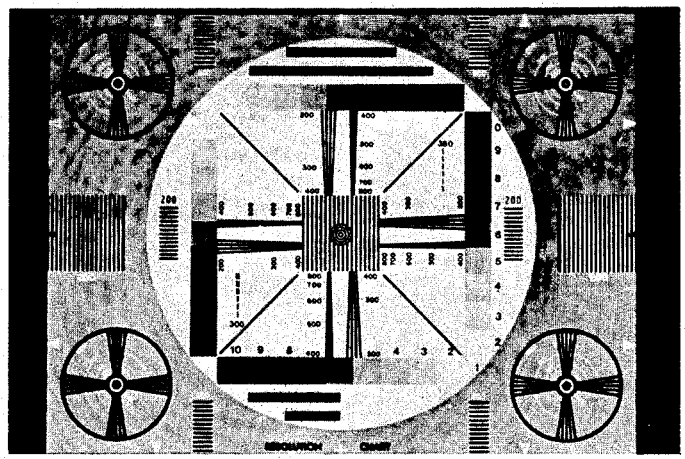
FIGS. 7A and 7B are reproduced images obtained by using a conventional optical system and the optical system of the embodiment, respectively.

The following method is considered in an attempt to eliminate speckle noises and make a redundant recording.

A parallel coherent light beam is passed through a grating and a Fourier-transform lens and thus divided into a plurality of light fluxes or secondary collimated light beams to be directed at different angles toward a subject which is located on a focal plane. Light fluxes or secondary light beams are individually suitably adjusted in their phase and amplitude so that all the interference fringes excepting those caused by two light fluxes incident at a maximum angle onto a focal plane are cancelled. The interference fringe of said two light fluxes incident at the maximum angle is made sufficiently small as compared with a picture element which is resoluble. Where, in this method, the phase of each light flux of the multiple light beam or secondary light beam is adjusted, a phase plate is required. As the phase plate, use is made of one giving relative phase differences of 0, $\pi/2$ and $\pi$ to the corresponding light fluxes as shown in FIG. 1A when considered one-dimensionally ($e^{i\phi(x)}$). When considered two-dimensionally ($e^{i(\phi(x)+\phi(y))}$), however, there is needed a phase plate designed to give relative phase differences of 0, $\pi/2$, $3/2\pi$ and $\pi$ as shown in FIG. 1B. Such a phase plate is formed by vapor depositing a suitable material onto a substrate and etching away unnecessary portions. In this case it is necessary that the vapor depositing step and etching step be each effected three times. If the phase plate is not manufactured with high accuracy, residual noises are produced on a reproduced image and it is impossible to obtain a clear-cut image. For this reason it is required that the vapor depositing and etching steps be conducted with very high accuracy. However, it is very cumbersome and difficult to effect the vapor depositing and etching steps three times with high accuracy, respectively and great manufacturing errors are introduced in its process.

An optical system according to this invention is based on the above-mentioned principle, but there is used a phase plate which is easily manufactured with high accuracy. An optical system according to this invention will be explained by reference to the accompanying drawings.

A plane wave from a coherent light source 10, such as a He-Ne gas laser source, is passed through a diffraction grating 11. The diffraction grating 11 constitutes a matrix array of rectangular transparent sections as well known in this field. Through the diffraction grating 11 is formed a multiple diffraction wave consisting of a plurality of light fluxes or secondary light beam having an amplitude determined by a ratio of the width of transparent section to that of the non-transparent section of the diffraction grating and a mutual interval determined by the pitch of the diffraction grating. The diffraction grating may be formed, for example, by selectively etching a phosphorous bronze plate. The diffraction waves are converged with a Fourier transform lens 12 arranged ahead of the diffraction grating 11, and directed at different incident angles toward and near to the focal plane of the Fourier transform lens 12. The diffracted light consists of a plurality of light fluxes or secondary light beam occupying different positions and having different orders on the focal plane of the Fourier transform lens 12. At the focal plane is arranged a phase plate 13 having a phase distribution of phase patterns as shown in FIG. 3A — considered one-dimensionally — which correspond to the positions where the light fluxes of different orders are incident. The phase plate 13 is designed to impart such a phase distribution to the multiple light that, with a light flux on the optical axis being regarded as a 0-order diffraction wave, "0"-relative phase is given to either one of those phases $P_1$, $P_{-1}$ corresponding to odd order diffraction waves different in sign (i.e. positivity and negativity) and equal in absolute value to each other and "$\pi$"-relative phase is given to the other one of the phases $P_1$, $P_{-1}$ (in this embodiment, $P_1 = \pi$, $P_{-1} = 0$), "0" or "$\pi$" is given to those phases $P_2$, $P_{-2}$ corresponding to even order diffraction waves different in sign and equal in absolute value to have the same relative phase (in this embodiment, $P_2=0$, $P_{-2}=0$) and the same "0" or "$\pi$" as those given to $P_2$ and $P_{-2}$ is given to the phase $P_0$ corresponding to the 0-order diffraction wave. Considered two-dimensionally, such phase plate is represented as shown in FIG. 3B. As indicated above, the two-dimensional phase matrix is determined in accordance with the equation:

$$e^{i\{\phi(x)+\phi(y)\}}=e^{i\phi(x)}\cdot e^{i\phi(y)};$$

FIGS. 4A, 4B to 6A, 6B show modified phase plates. The phase plate shown in FIG. 4A is used for a one-dimensional wave, while the phase plate shown in FIG. 4B is used for a two-dimensional wave. Likewise, the phase plates shown in FIGS. 5A and 6A are used for a one-dimensional wave and the phase plates shown in FIGS. 5B and 6B are used for a two-dimensional wave. As will be understood from the above the phase plate used in the optical system according to this invention is designed to give such a phase distribution that "0"-relative phase or "$\pi$"-relative phase is given to a phase corresponding to a 0-order diffraction wave, "0" is given to either one of those two phases corresponding to odd order diffraction waves different in sign and equal in absolute value to each other and "$\pi$" is given to the other one of the two phases, and the same "0" or "$\pi$" as is given to $P_0$ is given to those two phases corresponding to even order diffraction waves different in sign and equal in absolute value from each other. Though the abovementioned phase plates are all designed to impart a 5 × 5 array of phase distribution, the other n × n array of phase distribution, where n is positive odd integer, can be given with the same effect as obtained in the above-mentioned embodiment.

Any phase plate may be used if "$\pi$" or "0" is selectively and properly given to an incident light flux or secondary light beam of each order. For example, use is made of a phase plate designed to give a phase difference to an incident light by varying the index of refraction. The phase plate has two groups of sections with one group being different in refraction index from the other group, and is so designed that, when the incident light is passed through the two groups of sections of the phase plate, a phase difference of $\pi$ is given to an incident light due to the presence of the two groups of sections. The phase plate is formed by vapor depositing a predetermined material — for example, magnesium fluoride ($MgF_2$) or silicon oxide ($SiO_2$) — onto a transparent substrate to form a thin film of uniform thickness and then selectively etching away the portions of the thin film. In this case, the etched portions constitute said one group of sections, while the non-etched portions constitute said other group of sections. In this method, the vapor depositing and etching steps are each required only once and only one mask is employed during the manufacturing processes. As a result, the phase plate is easily manufactured with high accuracy.

The light fluxes or secondary light beams from the phase plate 13 are passed through an apertured plate 14 and collimated with inverse Fourier transform lens 15 and illuminate a subject 16 which is located on the focal plane of the converging lens.

Figure 7B:
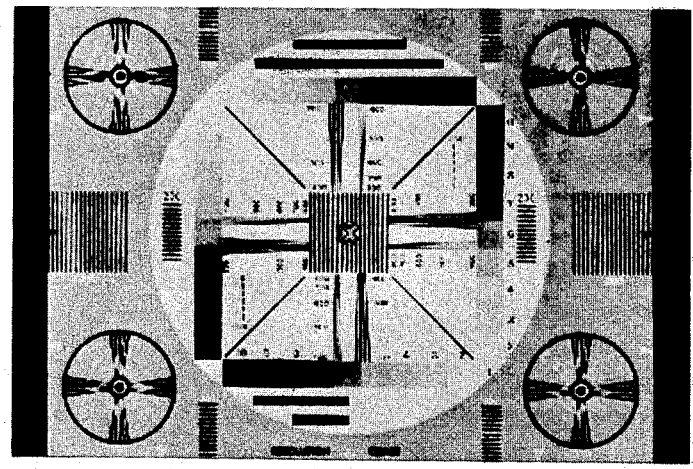

A hologram obtained utilizing as an illuminating light the light flux from the phase-plate-incorporated optical system according to this invention reconstructs an excellent speckle-free and moire-free reproduced image of high resolution as shown in FIG. 7A, as compared with the reconstructed image, as shown in FIG. 7B, which is obtained from a conventional optical system in which no such phase plate is employed.

As will be understood from the foregoing it is possible to obtain a high image resolution from the light flux which is obtained from the optical system according to this invention.

There will now be explained this invention more theoretically.

The intensity distribution of an "object" illuminating light, considered on an "object" plane, will be given as follows:

$$U = \left| a_0 e^{i(P_0+b_0)} + 2 \sum_{n=1}^{N} \{a_n e^{i(\frac{P_n+P_{-n}}{2})} \cos(\frac{2\pi n}{d} x + b_n + \frac{P_n+P_{-n}}{2})\} \right|^2 \quad (1)$$

provided that $a_n$ and $b_n$ represent the amplitude and phase, respectively, of the n-th light flux or secondary light beam as counted from an optical axis;

the amplitudes of $\pm$n-th light fluxes or secondary light beams are equal in amplitude to each other and the phases of the $\pm$n-th light fluxes are opposite in sign (positivity and negativity) and equal in absolute value to each other;

$P_n$ represents a phase of the n-th light flux passed through the phase plate;

d represents a grating space; and

M represents a positive constant greater than or equal to 1;

the phase plate allows light to be passed therethrough in a range defined by the $\pm$n-th light flux. Upon expanding the right side of the equation (1) the intensity distribution U of the light is $$U = \sum_{n=0}^{2N} U_n \quad (2)$$

provided that $$U_0 = a_0^2 + 2 \sum_{p=1}^{N} a_p^2 \quad (2-1)$$

. .
. .
. .

$$u_{2M} = 4a_0 a_{2M-1} \cos[\frac{P_{2M-1} - P_{-2M+1}}{2} - P_0] \cdot \cos[2\pi(2M-1)\frac{x}{d} + \frac{P_{2M-1} - P_{-2M+1}}{2}]$$

$$+ 4 \sum_{n=1}^{N-2M+1} a_n a_{n+2M-1} \cos[\frac{P_{n+2M-1} + P_{-n-2M+1}}{2} - \frac{P_n + P_{-n}}{2}] .$$

$$\cos[2\pi(2M-1)\frac{x}{d} + \frac{P_{n+2M-1} - P_{-n-2M+1}}{2} - \frac{P_n - P_{-n}}{2}]$$

$$+ 4 \sum_{n=1}^{M-1} a_n a_{2M-1-n} \cos[\frac{P_n + P_{-n}}{2} - \frac{P_{2M-1-n} + P_{-2M+1+n}}{2}] .$$

$$\cos[2\pi(2M-1)\frac{x}{d} + \frac{P_{2M-1-n} - P_{n-2M+1}}{2} + \frac{P_n - P_{-n}}{2}] \quad (2\text{-}2)$$

$$u_{2M} = 4a_0 a_{2M} \cos[\frac{P_{2M} + P_{-2M}}{2} - P_0]\cos[2\pi \cdot 2M \frac{x}{d} + \frac{P_{2M} - P_{-2M}}{2}]$$

$$+ 4 \sum_{n=1}^{N-2M} a_n a_{n+2M} \cos[\frac{P_{n+2M} + P_{-n-2M}}{2} - \frac{P_n + P_{-n}}{2}] .$$

$$\cos[2\pi \cdot 2M \frac{x}{d} + \frac{P_{n+2M} - P_{-n-2M}}{2} - \frac{P_n - P_{-n}}{2}]$$

$$+ 4 \sum_{n=1}^{M-1} a_n a_{2M-n} \cos[\frac{P_n + P_{-n}}{2} - \frac{P_{2M-n} + P_{-2M+n}}{2}] .$$

$$\cos[2\pi \cdot 2M \frac{x}{d} + \frac{P_{n+2M} - P_{-n-2M}}{2} + \frac{P_n - P_{-n}}{2}]$$

$$+ 2a_M^2 \cos[2\pi \cdot 2\pi \frac{x}{d} + P_M - P_{-M}] \quad (2\text{-}3)$$

$$\vdots$$

$$U_{2N} = 2a_N^2 \cos(4\pi N \frac{x}{d} + P_N - P_{-N}) \quad (2\text{-}4)$$

Since the phase plate is designed to impart such a relative phase distribution that, among the diffracted orders, "0" is given to either one of phases $P\pm 1, \ldots P\pm n \ldots, P\pm(2M-1) \ldots$ corresponding to those light fluxes whose order is different in sign (positivity and negativity) and equal in absolute value to each other which occupy odd order positions as counted from the optical axis and "$\pi$" is given to the other one of the phases $\pm 1, \ldots P\pm n \ldots, P\pm(2M-1) \ldots$ and "$\pi$" or "0" is given to either one of phases corresponding to even order light fluxes different in sign and equal in absolute value to each other which occupy even order positions as counted from the optical axis and the same "0" or "$\pi$" as is given to $P\pm 2M$ is given to a phase corresponding to a 0-order light flux which occupies on the optical axis, it will be followed that, in the equation (2), $$P_0 = 0, \frac{P_n \pm P_{-n}}{2} = \begin{cases} \frac{\pi}{2} \ldots n: \text{odd order} \\ 0 \ldots n: \text{even order} \end{cases} \quad (3)$$

or $$P_0 = \pi, \frac{P_n \pm P_{-n}}{2} = \begin{cases} \frac{\pi}{2} \ldots n: \text{odd order} \\ \pi \ldots n: \text{even order} \end{cases} \quad (3')$$

Since the first cos of the first, second and third terms of the right side of the equation (2—2) becomes $\pi/2$ or $-\pi/2$, $$U_{2M-1} = 0 \ldots (2\text{--}2')$$

Since the first cos of the first, second, third and fourth terms of the right side of the equation (2-3) becomes 0, and the second cos of the third and fourth terms of the right side of equation (2-3) becomes $$\cos[2\pi \cdot 2Mx/d + \pi] = (-\cos[2\pi \cdot 2Mx/d]) \text{ or}$$

$$\cos[2\pi \cdot 2Mx/d + 0] = (\cos[2\pi \cdot 2Mx/d])$$

$$u_{2M} = 4(a_0 a_{2M} + \sum_{n=1}^{N-2M} a_n a_{n+2M} + \sum_{n=1}^{M-1} (-1)^n a_n a_{2M-n} + (-1)^M \frac{1}{2} a_M^2) \cdot \cos(2\pi \cdot 2M \frac{x}{d}) \quad (2\text{-}3)'$$

The equation (2-3) can be set to zero as follows:

$$a_0 a_{2M} + \sum_{n=1}^{N-2M} a_n a_{n+2M} + \sum_{n=1}^{M-1} (-1)^n a_n a_{2M-n} + \frac{1}{2}(-1)^M a_M^2 = 0 \quad (4)$$

If the space of the diffraction grating, or elements performing the same function as the diffraction grating, is so adjusted as to satisfy Equation (4) for $M=1, \ldots, [N/2]$ ($[N/2]$ is the largest integer which does not exceed $N/2$) and thus the amplitude of the multiple light flux or secondary light beam is adjusted, the intensity distribution of the "object" illuminating light as shown in the equation (2) will be $$U = u_0 + u_{2M} = a_0^2 + 2 \sum_{p=1}^{N} a_p^2 + \quad (2')$$

$$2a_N^2 \cos(4\pi N \frac{x}{d} + P_N - P_{-N})$$

This indicates a multiple light flux or secondary light beams having an amplitude and phase distribution as based on the principle of Gabor. From these it is mathematically proved that an illuminating light flux obtained from the optical system according to this invention has a redundancy as in the case of an illuminating light flux obtained from the conventional optical system and includes little speckle noises.

As the phase plate of this invention need only be designed to impart two values of "0", "π" to the incident light even if considered two-dimensionally, it can be easily manufactured in a single vapor deposition process. Consequently it is possible to mass produce the phase plate with high accuracy and for a short period of time.

If the phase difference is deviated by Δ from the desired value, the residual error for the phase plate of this invention takes the form of sin Δ/2, while that for the conventional phase plate takes the form of sin Δ. As a result, the phase plate of this invention can reduce the error by 50%.

Though, in the above-mentioned optical system, explanation is restricted to the case where the object 16 is located on the focal plane of the inverse Fourier transform lens 15, even when the object is located in a position somewhat displaced from the focal plane of the transform lens, the same effect as in the above-mentioned embodiment can be obtained if the phase plate is constructed as set out below.

When a phase plate shown in FIG. 8A — considered one-dimensionally as shown in FIG. 8B it represents an array of 0, 0, π, 0, 0 in an X-direction and an array of 0, 0, π, 0, 0 in a Y-direction — imparts such a phase distribution that, with $P_0$ representing a phase corresponding to a light flux on an optical axis and being regarded as a 0-order diffraction wave, $P_1$, $P_{-1}$ are phases corresponding to odd order diffraction waves different in sign (positivity and negativity) and equal in absolute value to each other and $P_2$, $P_{-2}$ are phases corresponding to even order diffraction waves different in sign and equal in absolute value to each other, the phases $P_1$, $P_{-1}$, $P_2$, $P_{-2}$ are symmetrical in right and left directions as well as in up and down directions. Each selective phase value of the phase plate shown in FIG. 8A is obtained by adding each value occupied in the X-direction and the corresponding value occupied in the Y-direction.

FIGS. 9A and 10A show examples of the phase plate of FIG. 8A. With the phase plate shown in FIG. 9A each value of relative phases is obtained by providing as shown in FIG. 9B an array of 0, 0, π, 0, 0 in an X-direction and an array of π, 0, 0, 0, π in a Y-direction and adding in a matrix manner each value occupied in the X-direction and the corresponding value occupied in the Y-direction. With the phase plate shown in FIG. 10A each value of relative phases is obtained by providing as shown in FIG. 10B an array of π, 0, 0, 0, π in an X-direction and an array of π, 0, 0, 0, π in a Y-direction and adding in a matrix manner each value occupied in the X-direction and the corresponding value occupied in the Y-direction.

Each value of the one-dimensional relative phase as shown in FIGS. 8B, 9B and 10B is determined for reasons set out below.

Where the phase plate according to this invention is used, the object is conditioned to be located in a position a value of Δz away from the image plane of the diffraction grating. The intensity distribution of the illuminating light in this object plane can be expressed as follows, when only the X-direction component is considered.

$$I(x) = | \sum_{-n}^{n} a_n \exp[i(2\pi \frac{n}{d} x + P_n - \pi\lambda(\frac{n^2}{d^2})\Delta z]|^2$$

in which n denotes the order as counted from the optical axis; $a_n$ denotes the amplitude of the n-th light flux; and $P_n$ denotes the phase of the n-th light flux. If Δz is selected to be $$\Delta z = \frac{d^2}{\lambda}(M + \frac{1}{2})$$

(M being any odd or even integer) it follows that each order of $\{P_n\}$ is subjected to a modification of $\pi n^2/2$. That is, in the case of the 0-order no modification is involved, while in the case of the ±1st order a modification of π/2 is involved. In this way, the phase appearing on the "object plane" is so modified due to the displacement of Δz. With this modification taken into consideration each phase value of the phase plate may be determined.

What is claimed is:

1. An optical system for an object illuminating light source, comprising a source for emitting a collimated coherent light beam, means for converting the collimated light beam into a multiplicity of secondary collimated light beams travelling in different directions, a lens for focusing each secondary light beam at a unique convergence area in the focal plane of the lens and means located substantially at the focal plane for giving either one of "0"-relative phase or "π"-relative phase to each secondary light beam convergence area to cancel at a plane spaced from the phase giving means all interference fringes, created by the interference of the secondary light beams, except for those interference fringes caused by the secondary light beams incident on the lens having the greatest angle relative to the optical axis of the lens.

2. An optical system for a coherent illuminating light source, comprising a source for emitting a collimated coherent light beam, diffraction means for converting by diffraction the collimated light beam into a multiplicity of secondary collimated light beams travelling in different directions, the secondary light beams parallel to the collimated light beam defining zero order secondary light beam and the secondary light beams travelling at discretely increasing angles from the zero order secondary light beam defining incrementally increasing orders, the secondary light beam orders having angles increasing in one direction from the zero order secondary light beam defining positive orders and the secondary light beam orders having angles increasing in the other direction defining negative orders, a lens for focusing each secondary light beam at a unique, discrete convergence area in the focal plane of the lens, and a phase plate located substantially at the focal plane for imparting such a phase distribution that either one of "0"-relative phase and "π"-relative phase is given to the zero order secondary light beam, "0"-relative phase is given to either one of the odd order secondary light beams different in sign and equal in absolute value to each other and "π"-relative phase is given to the other one of the odd order secondary light beams, and "0"-relative phase is given to even order secondary light beams.

3. An optical system according to claim 2, in which said source includes a laser source.

4. An optical system according to claim 2, in which said diffraction means comprises a diffraction grating for receiving the light from the source and converting it into secondary light beams.

5. An optical system according to claim 4, in which another lens is further provided for converging the secondary light beams which are passed through the phase plate.

6. An optical system according to claim 2, in which said phase plate has first and second groups of sections, the sections of said first group being different in thickness from those of said second group, whereby "$\pi$"-relative phase is given to the secondary light beams passed through said first group of sections and "0"-relative phase is given to the secondary light beams passed through said second group of sections.

* * * * *